US012637606B1

(12) United States Patent
Elkatatny et al.

(10) Patent No.: US 12,637,606 B1
(45) Date of Patent: May 26, 2026

(54) METHOD OF DRILLING WELLBORE INTO SUBTERRANEAN GEOLOGICAL FORMATION

(71) Applicant: KING FAHD UNIVERSITY OF PETROLEUM AND MINERALS, Dhahran (SA)

(72) Inventors: Shaimaa Salaheldin Mahmoud Ahmed Elkatatny, Dhahran (SA); Salem Abdullah Musallam Basfar, Dhahran (SA); Salaheldin Mahmoud Ahmed Elkatatny, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/367,640

(22) Filed: Oct. 23, 2025

Related U.S. Application Data

(60) Provisional application No. 63/811,383, filed on May 23, 2025.

(51) Int. Cl.
*C09K 8/36* (2006.01)
*E21B 21/06* (2006.01)
(52) U.S. Cl.
CPC .............. *C09K 8/36* (2013.01); *E21B 21/062* (2013.01)
(58) Field of Classification Search
CPC ................................ C09K 8/36; E21B 21/062
See application file for complete search history.

(56) References Cited

U.S. PATENT DOCUMENTS

| | | | | |
|---|---|---|---|---|
| 4,210,626 A | * | 7/1980 | Berrie | C01F 11/46 |
| | | | | 423/166 |
| 2007/0102154 A1 | | 5/2007 | Grott | |
| 2008/0248975 A1 | * | 10/2008 | Mazard | C09K 8/36 |
| | | | | 507/227 |
| 2013/0210683 A1 | | 8/2013 | Collins et al. | |
| 2019/0359495 A1 | | 11/2019 | Singh et al. | |
| 2024/0166934 A1 | | 5/2024 | Ramasamy et al. | |

FOREIGN PATENT DOCUMENTS

| | | | | | |
|---|---|---|---|---|---|
| CN | 1258269 A | * | 6/2000 | | B09B 3/25 |
| RU | 1055750 A1 | | 11/1983 | | |

* cited by examiner

*Primary Examiner* — Kumar R Bhushan
(74) *Attorney, Agent, or Firm* — Oblon, McClelland, Maier & Neustadt, L.L.P.

(57) ABSTRACT

A method of drilling a wellbore into a subterranean geological formation includes drilling the subterranean geological formation to form the wellbore, then circulating an invert emulsion drilling fluid into the wellbore during the drilling to suspend cuttings formed during the drilling. The invert emulsion drilling fluid includes diesel, a primary emulsifier, a secondary emulsifier, a brine including water and a polished brine sludge (PBS) powder including halite in an amount of 55 to 75 wt. %, calcite in an amount of 25 to 40 wt. %, and brucite in an amount of 2 to 6 wt. %, based on the total dry weight of the PBS powder, at least one viscosifier, at least one weighting agent, and at least one alkali. The invert emulsion drilling fluid has an oil-to-water volume ratio of 90:10 to 70:30. The invert emulsion drilling fluid does not include calcium chloride.

19 Claims, 6 Drawing Sheets

METHOD OF DRILLING WELLBORE INTO SUBTERRANEAN GEOLOGICAL FORMATION

CROSS-REFERENCE TO RELATED APPLICATION

The present application claims benefit of priority to U.S. Provisional Application No. 63/811,383 having a filing date of May 23, 2025, and which is incorporated herein by reference in its entirety.

BACKGROUND

Technical Field

The present disclosure is directed to a method of drilling a wellbore into a subterranean geological formation, more preferably, a method of drilling a wellbore into a shale formation.

Description of Related Art

The 'background' description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Drill-in and completion fluids play a vital role in drilling and completing wellbores in subterranean formations by controlling pressure, preventing blowouts, and protecting formation integrity. However, conventional fluids contain solids or reactive components that can cause formation damage or corrosion, particularly in challenging environments such as deepwater.

Accordingly, an object of the present disclosure is directed to a simple and efficient method of drilling a wellbore into a subterranean geological formation, thereby overcoming the limitations of the prior art.

SUMMARY

In an exemplary embodiment, a method of drilling a wellbore into a subterranean geological formation is described. The method includes drilling the subterranean geological formation to form the wellbore, then circulating an invert emulsion drilling fluid into the wellbore during the drilling to suspend cuttings formed during the drilling. The invert emulsion drilling fluid includes diesel, a primary emulsifier, a secondary emulsifier, a brine including water and a polished brine sludge (PBS) powder including halite in an amount of 55 to 75 wt. %, calcite in an amount of 25 to 40 wt. %, and brucite in an amount of 2 to 6 wt. %, based on the total dry weight of the PBS powder, at least one viscosifier, at least one weighting agent, and at least one alkali. The invert emulsion drilling fluid has an oil-to-water volume ratio of 90:10 to 70:30. The invert emulsion drilling fluid does not include calcium chloride. The subterranean geological formation is a shale formation and the invert emulsion drilling fluid does not expand shale adjacent to the wellbore.

In some embodiments, the PBS powder includes chlorine in an amount of 40 to 70 wt. %, calcium in an amount of 15 to 30 wt. %, sodium in an amount of 10 to 20 wt. %, magnesium in an amount of 3 to 9 wt. %, based on the total dry weight of the PBS powder.

In some embodiments, the invert emulsion drilling fluid includes diesel in an amount of 60 to 75 vol %, brine in an amount of 10 to 25 vol %, and emulsifier in an amount of 10 to 15 vol %, based on the total volume of the invert emulsion drilling fluid.

In some embodiments, the primary emulsifier and the secondary emulsifier are present in the invert emulsion drilling fluid at a volume ratio of 1 to 3:1.

In some embodiments, the invert emulsion drilling fluid has an electrical stability of 900 to 1200 V.

In some embodiments, the invert emulsion drilling fluid has a plastic viscosity of 18 to 20 cP.

In some embodiments, the invert emulsion drilling fluid has a yield point of 15 to 21 lb/100 ft$^2$.

In some embodiments, the invert emulsion drilling fluid has a filtration volume of 2 to 6 cm$^3$ at a temperature of 125 to 175° C. and a pressure of 400 to 600 psi.

In some embodiments, the invert emulsion drilling fluid has a gel strength of 7 to 12 lb/100 ft$^2$.

In another exemplary embodiment, a method of forming the invert emulsion drilling fluid is described. The method includes combining the diesel with the primary emulsifier and the secondary emulsifier to obtain an oil mixture. The method includes mixing the brine with the oil mixture to obtain an emulsion. The method includes adding the viscosifiers, the weighting agents, and the alkali to the emulsion to obtain the drilling fluid composition.

In some embodiments, the PBS powder has a particle size less than or equal to 100 μm.

In some embodiments, the primary emulsifier and the secondary emulsifier are at least two selected from the group consisting of amidoamines, imidazolines, alkanolamides, and modified fatty acids.

In some embodiments, the viscosifier is at least one selected from the group consisting of organophilic clays, polymeric viscosifiers, liquid viscosifiers, and fumed silica.

In some embodiments, the viscosifier is at least one selected from the group consisting of Geltone II, Duratone, Garamite, and combinations thereof.

In some embodiments, the weighting agent is at least one selected from the group consisting of barite, hematite, calcium carbonate, siderite, ilmenite, and combinations thereof.

In some embodiments, the alkali is at least one selected from the group consisting of sodium hydroxide, potassium hydroxide, sodium carbonate, potassium carbonate, and combinations thereof.

In some embodiments, the invert emulsion drilling fluid is used to drill a vertical well, a decline well, and a horizontal well.

In some embodiments, the invert emulsion drilling fluid is used to drill an oil well, a gas well, and a water well.

In some embodiments, the invert emulsion drilling fluid is used to drill a hydrogen storage well and a $CO_2$ sequestration well.

In some embodiments, the invert emulsion drilling fluid has a density of 11 to 13 ppg.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
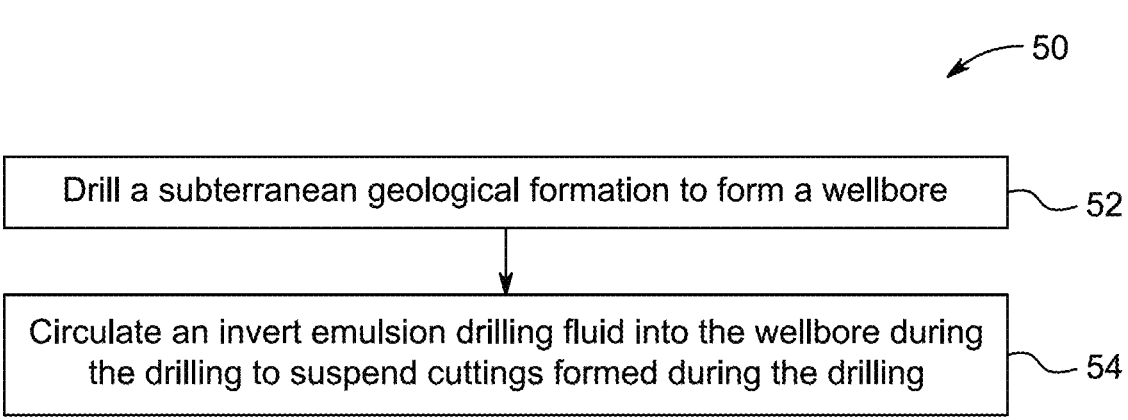
FIG. 1A is a schematic diagram of a method of drilling a wellbore into a subterranean geological formation, according to certain embodiments.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term 'room temperature' refers to a temperature range of 25 degrees Celsius (° C.)+3° C. in the present disclosure.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and 180. Isotopes of hydrogen include $^{1}H$, $^{2}H$, and $^{3}H$. Isotopes of copper include $^{63}Cu$, and $^{65}Cu$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'wellbore' refers to the drilled hole created in the earth's surface to access a subterranean formation, which may be open (uncased) or lined with casing and is designed to facilitate the extraction of fluids such as oil, gas, or water.

As used herein, the term 'subterranean geological formation' refers to a naturally occurring layer or strata of rock located below the earth's surface, which may contain hydrocarbons or other resources of interest for drilling and extraction operations.

As used herein, the term 'invert emulsion drilling fluid' refers to a type of oil-based drilling fluid in which the continuous phase is oil and the dispersed (internal) phase is water or brine, forming a water-in-oil emulsion that provides stability, lubricity, and shale inhibition during drilling operations.

As used herein, the term 'primary emulsifier' refers to a chemical additive used in invert emulsion drilling fluids to stabilize the water-in-oil emulsion by promoting the dispersion of water droplets within the continuous oil phase.

As used herein, the term 'secondary emulsifier' refers to an additive used in conjunction with a primary emulsifier to enhance emulsion stability, improve fluid performance, and help maintain the integrity of the invert emulsion under varying downhole conditions.

As used herein, the term 'viscosifier' refers to a chemical agent added to a drilling fluid to increase its viscosity, thereby improving the suspension and transport of drill cuttings and weighting materials throughout the circulating system.

As used herein, the term 'weighting agent' refers to a high-density solid material, such as barite, that is added to drilling fluids to increase the fluid density and thereby help control formation pressures and prevent wellbore instability or blowouts.

As used herein, the term 'electrical stability' refers to a measure of the emulsion stability of an invert emulsion drilling fluid, typically expressed in volts, indicating the fluid's resistance to phase separation and its overall emulsion integrity under downhole conditions.

As used herein, the term 'plastic viscosity' refers to the portion of a drilling fluid's viscosity that is attributed to the internal resistance to flow due to the continuous phase, representing the fluid's ability to carry solids under laminar flow conditions.

As used herein, the term 'yield point' refers to the measure of the initial stress required to initiate flow in a drilling fluid, reflecting the fluid's ability to suspend cuttings and weighting materials when circulation is stopped.

As used herein, the term 'filtration volume' refers to the amount of fluid that passes through a filter medium under standardized conditions, indicating the fluid's ability to form a low-permeability filter cake and control fluid loss into permeable formations.

As used herein, the term 'gel strength' refers to the measure of the drilling fluid's ability to develop a gel structure under static conditions, which helps suspend solids and prevent settling when circulation is halted, typically measured after 10 seconds and 10 minutes of static time.

As used herein, the term 'diesel' refers to diesel oil or diesel fuel, which is a mixture of hydrocarbon chains, typically containing 8 to 21 carbon atoms. It is a distilled petroleum product usually used in diesel engines, burned to generate power for heavy equipment, vehicles, and some power generation systems.

As used herein, the term 'polished brine sludge (PBS)' refers to the byproduct or waste of a brine polishing process, which is a purification step that removes trace contaminants, such as fine solids, dissolved ions, and microorganisms, from a brine solution to meet quality standards or protect downstream equipment. The brine polishing process involves a filtration system that removes fine particles to achieve a high level of clarity. In one embodiment, the PBS is the solid byproduct of the filtration system. In another embodiment, the 'polished brine sludge' is the waste byproduct generated from industrial processes that utilize rock salt (NaCl) to produce chlor-alkali products. This industry produces materials such as caustic soda, hydrochloric acid, chlorine, and water treatment chemicals. The PBS is a waste material collected from chlor-alkali facilities after the brine has passed through candle polish precoat filters. The 'polished brine sludge (PBS) powder' refers to a dehydrated polished brine sludge. The polished brine sludge may be treated with a reducing agent, or an oxidizing agent before or after dehydration. The dehydrated polished brine sludge may be crushed, blended, ground, and/or sieved to obtain the polished brine sludge powder with a particle size of 0.01 to 1000 μm, preferably 1 to 1000 μm, preferably 1 to 100 μm, preferably 20 to 50 μm Aspects of the present disclosure are directed to a method of drilling a wellbore into a subterranean geological formation, more preferably, a method of drilling a wellbore into a shale formation.

FIG. 1A illustrates a flow chart of a method 50 of drilling a wellbore into a subterranean geological formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes drilling the subterranean geological formation to form the wellbore. The subterranean geological formation may include, but is not limited to, a depleted oil reservoir, a depleted gas reservoir, a sour reservoir, a hydrocarbon bearing subterranean formation, a saline formation, or an un-minable coal bed. In one or more embodiments, the wellbore may be present in an oil well, a gas well, a production well, an injection well, a naturally flowing well, an artificially lifted well, a high-temperature well, a steam-assisted gravity drainage well, a steam injector well, or a geothermal well. The wellbore may be formed in the subterranean geologic formation by known techniques.

At step 54, the method 50 includes circulating an invert emulsion drilling fluid into the wellbore during the drilling to suspend cuttings formed during the drilling. In some embodiments, the drilling fluid may be continuously circulated from the surface through a drill string and back up an annulus to transport and suspend cuttings. In some embodiments, the drilling fluid may be pumped intermittently to suspend cuttings during pauses in drilling operations. In some embodiments, the drilling fluid may be circulated using a reverse circulation system where fluid enters through the annulus and returns through a drill pipe. In some embodiments, a high-viscosity sweep may be periodically circulated to enhance cuttings suspension and hole cleaning. In some embodiments, the drilling fluid may be circulated using a dual-gradient or managed pressure system to enhance cuttings transport under varying pressure conditions.

In some embodiments, the invert emulsion drilling fluid is used to drill a vertical well, a decline well, and a horizontal well. In some embodiments, the invert emulsion drilling fluid is used to drill an oil well, a gas well, and a water well. In some embodiments, the invert emulsion drilling fluid is used to drill a hydrogen storage well and a $CO_2$ sequestration well. In some embodiments, the invert emulsion drilling fluid has a density of 11 to 13 ppg, preferably from 11.1 to 12.9 ppg, preferably from 11.2 to 12.8 ppg, preferably from 11.3 to 12.7 ppg, preferably from 11.4 to 12.6 ppg, preferably from 11.5 to 12.5 ppg, preferably from 11.6 to 12.4 ppg, preferably 11.7 ppg.

The invert emulsion drilling fluid includes diesel, a primary emulsifier, a secondary emulsifier, a brine including water and a polished brine sludge (PBS) powder including halite in an amount of 55 to 75 wt. %, preferably from 56 to 74 wt. %, more preferably from 57 to 73 wt. %, even more preferably from 58 to 72 wt. %, and still more preferably from 59 to 71 wt. %. In further refined embodiments, the composition is preferably from 60 to 70 wt. %, from 61 to 69 wt. %, from 62 to 68 wt. %, from 63 to 67 wt. %, or most preferably 63.7 wt. %; calcite in an amount of 25 to 40 wt. %, preferably from 26 to 39 wt. %, more preferably from 27 to 38 wt. %, even more preferably from 28 to 37 wt. %, and still more preferably from 29 to 36 wt. %. In further refined embodiments, the composition is preferably from 30 to 35 wt. %, from 31 to 34 wt. %, or most preferably from 32.2 wt. %; and brucite in an amount of 2 to 6 wt. %, 3 to 5 wt. %, more preferably from 3.2 to 4.8 wt. %, even more preferably from 3.5 to 4.5 wt. %, and most preferably from 3.8 to 4.2 wt. %, preferably 4.1 wt. % based on the total dry weight of the PBS powder, at least one viscosifier, at least one weighting agent, and at least one alkali. The invert emulsion drilling fluid has an oil-to-water volume ratio of 90:10 to 70:30, preferably 4. The invert emulsion drilling fluid does not include calcium chloride. The subterranean geological formation is a shale formation and the invert emulsion drilling fluid does not expand shale adjacent to the wellbore.

In some embodiments, the PBS powder includes chlorine in an amount of 40 to 70 wt. %, preferably from 42 to 68 wt. %, preferably from 44 to 66 wt. %, preferably from 46 to 64 wt. %, preferably from 48 to 62 wt. %, preferably from 50 to 60 wt. %, preferably from 52 to 58 wt. %, and preferably 57 wt. %; calcium in an amount of 15 to 30 wt. %, preferably from 16 to 29 wt. %, preferably from 17 to 28 wt. %, preferably from 18 to 27 wt. %, preferably from 19 to 26 wt. %, preferably from 20 to 25 wt. %, and most preferably 21 wt. %; sodium in an amount of 10 to 20 wt. %, preferably from 11 to 19 wt. %, preferably from 12 to 18 wt. %, preferably from 13 to 17 wt. %, preferably from 14 to 16 wt.

%, and most preferably around 15 wt. %; magnesium in an amount of 3 to 9 wt. %, preferably from 3.5 to 8.5 wt. %, preferably from 4 to 8 wt. %, preferably from 4.5 to 7.5 wt. %, preferably from 5 to 7 wt. %, and most preferably around 6 wt. % based on the total dry weight of the PBS powder.

In some embodiments, the invert emulsion drilling fluid includes diesel in an amount of 60 to 75 vol %, preferably from 61 to 74 vol %, more preferably from 62 to 73 vol %, even more preferably from 63 to 72 vol %, and still more preferably from 64 to 71 vol %. In further refined embodiments, the composition is preferably from 65 to 70 vol %, from 66 to 69 vol %, or most preferably from 67.1 vol %; brine in an amount of 10 to 25 vol %, and emulsifier in an amount of 10 to 15 vol %, based on the total volume of the invert emulsion drilling fluid. In some embodiments, the primary emulsifier and the secondary emulsifier are present in the invert emulsion drilling fluid at a volume ratio of 1 to 3:1, preferably 2:1, preferably 3:2.

In some embodiments, the invert emulsion drilling fluid has an electrical stability of 900 to 1200 V, preferably from 910 to 1190 V, preferably from 920 to 1180 V, preferably from 930 to 1170 V, preferably from 940 to 1160 V, preferably from 950 to 1150 V, preferably from 960 to 1140 V, preferably from 970 to 1130 V, preferably from 980 to 1120 V, preferably from 990 to 1110 V, preferably from 1000 to 1100 V, preferably from 1010 to 1090 V, preferably from 1020 V.

In some embodiments, the invert emulsion drilling fluid has a plastic viscosity of 18 to 20 cP, preferably from 18.1 to 19.9 cP, preferably from 18.2 to 19.8 cP, preferably from 18.3 to 19.7 cP, preferably from 18.4 to 19.6 cP, preferably from 18.5 to 19.5 cP, preferably from 18.6 to 19.4 cP, preferably from 18.7 to 19.3 cP, preferably from 18.8 to 19.2 cP, and most preferably from 18.9 to 19.1 cP, preferably 19 cP.

In some embodiments, the invert emulsion drilling fluid has a yield point of 15 to 21 lb/100 ft$^2$, preferably from 15.5 to 20.5 lb/100 ft$^2$, preferably from 16 to 20 lb/100 ft$^2$, preferably from 16.5 to 19.5 lb/100 ft$^2$, preferably from 17 to 19 lb/100 ft$^2$, preferably from 17.5 to 18.5 lb/100 ft$^2$, and most preferably around 18 lb/100 ft$^2$.

In some embodiments, the invert emulsion drilling fluid has a filtration volume of 2 to 6 cm$^3$, preferably from 2.2 to 5.8 cm$^3$, preferably from 2.4 to 5.6 cm$^3$, preferably from 2.6 to 5.4 cm$^3$, preferably from 2.8 to 5.2 cm$^3$, preferably from 3 to 5 cm$^3$, preferably from 3.2 to 4.8 cm$^3$, preferably from 3.4 to 4.6 cm$^3$, preferably from 3.6 to 4.4 cm$^3$, and most preferably from 3.8 to 4.2 cm$^3$, preferably 4 cm$^3$ at a temperature of 125 to 175° C., preferably from 130 to 170° C., preferably from 135 to 165° C., preferably from 140 to 160° C., preferably from 145 to 155° C., preferably 148° C. and pressure of 400 to 600 psi, preferably from 410 to 590 psi, preferably from 420 to 580 psi, preferably from 430 to 570 psi, preferably from 440 to 560 psi, preferably from 450 to 550 psi, preferably from 460 to 540 psi, preferably from 470 to 530 psi, preferably from 480 to 520 psi, and most preferably from 490 to 510 psi, preferably 500 psi. In some embodiments, the invert emulsion drilling fluid has a gel strength of 7 to 12 lb/100 ft$^2$, preferably 7.5 to 11.5 lb/100 ft$^2$, preferably 8 to 11 lb/100 ft$^2$, preferably about 8 lb/100 ft$^2$, preferably about 9 lb/100 ft$^2$.

Figure 1B:
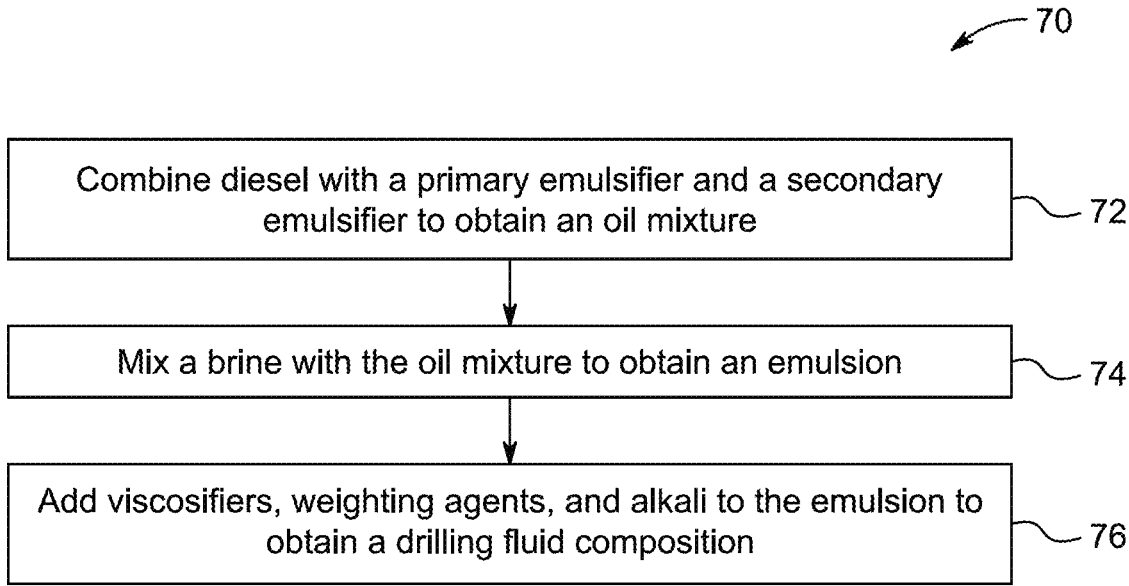
FIG. 1B is a schematic diagram of a method of forming an invert emulsion drilling fluid, according to certain embodiments.

FIG. 1B illustrates a flow chart of a method 70 of forming the invert emulsion drilling fluid. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes combining the diesel with the primary emulsifier and the secondary emulsifier to obtain an oil mixture. In some embodiments, the diesel is first mixed with the primary emulsifier, followed by the gradual addition of the secondary emulsifier under continuous stirring to ensure uniform dispersion. In some embodiments, the primary and secondary emulsifiers are pre-blended to form a homogeneous mixture, which is then added to the diesel. In some embodiments, high-shear mixing is employed, where the diesel is combined with the primary emulsifier first, and the secondary emulsifier is added under high-shear conditions to enhance emulsion stability. In some embodiments, the diesel is heated to reduce viscosity before sequentially adding the primary and secondary emulsifiers at elevated temperatures to improve solubility and mixing. In some embodiments, all components are introduced into an in-line mixer simultaneously, allowing continuous production of the oil mixture. In some embodiments, the ratio of primary to secondary emulsifier is varied depending on the specific requirements of the formulation. In some embodiments, a batch process is used where all components are mixed and allowed to settle, ensuring homogeneity before use.

In some embodiments, the primary emulsifier and the secondary emulsifier are at least two selected from the group consisting of amidoamines, imidazolines, alkanolamides, and modified fatty acids. Examples of the primary emulsifier may include ethoxylated nonylphenols, sorbitan monooleate (such as Span 80), polyoxyethylene sorbitan monooleate (such as Tween 80), alkyl polyglucosides, quaternary ammonium salts, lecithin, and block copolymers such as Pluronics. Suitable secondary emulsifiers can include polyethylene glycols (PEGs), propylene glycol, polyvinyl alcohol, gum arabic, xanthan gum, cellulose derivatives such as hydroxyethyl cellulose, and siloxane-based surfactants. These emulsifiers can be selected based on the required emulsion stability, compatibility with other components, and specific application needs.

At step 74, the method 70 includes mixing the brine with the oil mixture to obtain an emulsion. Mixing the brine with the oil mixture to obtain the emulsion may be done by stirring, shaking, vortex mixing, high-shear mixing, ultrasonic mixing, homogenization, or in-line mixing. Suitable examples of salts that can be present in the brine may include common table salt, baking soda, sodium sulfate, magnesium chloride, potassium chloride, potassium sulfate, potassium bicarbonate, calcium sulfate, calcium nitrate, magnesium sulfate, magnesium nitrate, magnesium acetate, washing soda, disodium phosphate, sodium nitrate, potassium bicarbonate, magnesium bicarbonate, iron(II) chloride, iron(III) chloride, iron(II) sulfate, potassium sulfate, barium sulfate, lithium chloride, lithium sulfate, lithium nitrate. In some embodiments, the brine may include one or more salts selected from a group consisting of table salt, baking soda, sodium sulfate, and magnesium chloride. In a preferred case, the brine includes polished brine sludge (PBS). In some embodiments, the PBS powder has a particle size less than or equal to 100 μm, preferably 1 to 100 μm, preferably 5 to 90 μm, preferably 15 to 80 μm, preferably 20 to 70 μm, preferably 20 to 60 μm, more preferably 20 to 50 μm.

At step 76, the method 70 includes adding the viscosifiers, the weighting agents, and the alkali to the emulsion to obtain the drilling fluid composition. In some embodiments, the viscosifiers may include, but are not limited to, sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (such as attapulgite, sepiolite), and combinations thereof. In some embodiments, the viscosifier is at least one selected from the group consisting of organo-philic clays, polymeric viscosifiers, liquid viscosifiers, and fumed silica. In some embodiments, the viscosifier is at least one selected from the group consisting of Geltone II, Dura-tone, Garamite, and combinations thereof.

In some embodiments, the weighting agent is at least one selected from the group consisting of barite, hematite, calcium carbonate, siderite, ilmenite, and combinations thereof. In some embodiments, the alkali is at least one selected from the group consisting of sodium hydroxide, potassium hydroxide, sodium carbonate, potassium carbon-ate, and combinations thereof.

In some embodiments, the drilling fluid composition may also include any suitable additives. Exemplary additives include, but are not limited to, weighting agents, emulsifiers, viscosities, fluid-loss control agents, bridging agents, pH controlling agents, defoamers, crosslinker, clay stabilizers, anti-scalants, deflocculants, lubricants, gelling agents, cor-rosion inhibitors, rheology control modifiers or thinners, high temperature/high pressure control additives, acids, alkalinity agents, chelating agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative per-meability modifiers, resins, particulate materials (e.g., prop-pant particulates), wetting agents, coating enhancement agents, filter cake removal agents, odorants, shale stabiliz-ers. A person of ordinary skill in the art, with the benefit of this disclosure, will recognize the types and suitable amounts of additives that may be included in the drilling fluid composition for a particular application, without undue experimentation.

In some embodiments, the deflocculant may include, but is not limited to, an anionic polyelectrolyte, for example, acrylates, polyphosphates, lignosulfonates (LS), or tannic acid derivatives, for example, quebracho. In some embodi-ments, the lubricant may include, but is not limited to, polyalpha-olefin (PAO), synthetic esters, polyalkylene gly-cols (PAG), phosphate esters, alkylated naphthalenes (AN), silicate esters, ionic fluids, and multiply alkylated cyclopen-tanes (MAC).

The crosslinker may include, but is not limited to, metallic salts, such as salts of Al, Fe, B, Ti, Cr, and Zr, or organic crosslinkers such as polyethylene amides and formaldehyde. The breaker may include, but is not limited to, oxidizing agents, such as sodium chlorites, sodium bromate, hypo-chlorites, perborate, persulfates, peroxides, and enzymes. The biocide may include, but is not limited to, phenoxy-ethanol, ethylhexyl glycerine, benzyl alcohol, methyl chlor-oisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial.

The corrosion inhibiting agent or corrosion inhibitors may include, but is not limited to, imidazolines, and amido amines. In some embodiments, the corrosion inhibiting agent may include, but is not limited to, oxides, sulfides, halides, nitrates, preferably halides, of metallic elements of group IIIa to VIa such as $SbBr_3$.

The anti-scalants or anti-scaling agent may include, but is not limited to, phosphonates, acrylic co/ter-polymers, poly-acrylic acid (PAA), phosphino poly carboxylic acid (PPCA), phosphate esters, hexamethylene diamine tetrakis (methyl-ene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid. The chelating agent may include, but is not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA).

The following examples are provided solely for illustra-tion and are not to be construed as limitations of the present disclosure, as many variations thereof are possible without departing from the spirit and scope of the present disclosure.

Examples

The following examples demonstrate a method of drilling a wellbore into a subterranean geological formation. The examples are provided solely for illustration and are not to be construed as limitations of the present disclosure, as many variations thereof are possible without departing from the spirit and scope of the present disclosure.

The drilling fluid formulation for invert emulsion drilling fluid follows an 80/20 oil-to-water ratio, ensuring desired performance in drilling operations. The aqueous phase in this system is a saturated brine solution, playing an impor-tant role in controlling shale hydration and preventing wellbore instability. Two formulations were prepared: Fluid 1: Uses a calcium chloride ($CaCl_2$) saturated brine (approxi-mately 32 lb), serving as the conventional fluid to prevent shale swelling. Fluid 2: Contains polished brine sludge (PBS) as the brine phase, where sodium chloride (NaCl) is the primary salt component. In this work, the PBS samples are collected from chlor-alkali facilities after the brine has passed through candle polish precoat filters. The residue retained by these filters constitutes the PBS as a waste material. The collected PBS is subsequently dried at 250° F. for 24 hours to eliminate residual moisture. After drying, PBS is crushed and sieved to achieve a uniform particle size, preferably within the range of 1 to 100 μm.

This method utilizes a waste-derived product, offering environmental and economic benefits.

Both fluids were designed to maintain a density of 11.7 ppg, ensuring the required hydrostatic pressure control for safe drilling operations. Table 1 presents the detailed for-mulation for preparing 1 bbl of the drilling fluid.

TABLE 1

| | Fluid 1 CaCl$_2$ | Fluid 2 PBS |
|---|---|---|
| | Drilling Fluid Formulation to prepare 1 bbl using Polished Brine Sludge as a Brine. | |
| Component | Quantity | Quantity |
| Diesel | 0.671 | 0.671 |
| Primary Emulsifier | 12 ml | 12 ml |
| Lime | 6 g | 6 g |
| Brine | 0.171 | 0.171 |
| Geltone II | 6 g | 6 |
| Duratone | 6 g | 6 |
| Secondary Emulsifier | 8 ml | 8 ml |
| CaCO3-25 | 20 g | 20 g |
| Barite | 150 g | 150 g |

Electrical stability (ES) is an important parameter in evaluating the integrity of invert emulsion drilling fluids. It measures the strength of the emulsion, which is important for maintaining stable wellbore conditions and preventing phase separation.

Figure 1C:
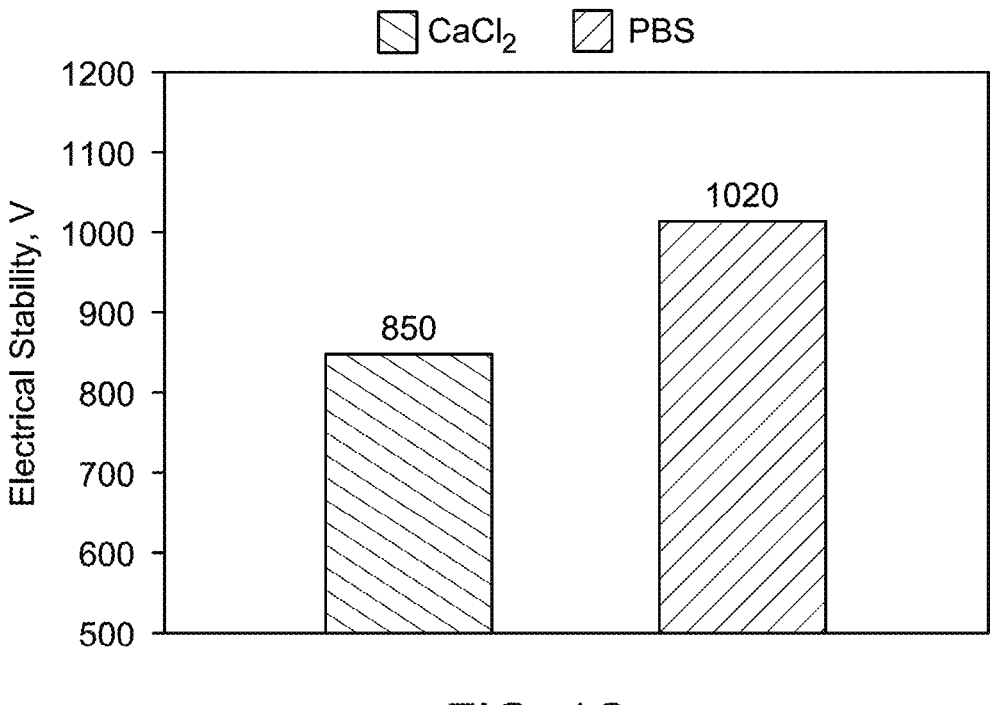
FIG. 1C depicts emulsion stability of the invert emulsion drilling fluids, according to certain embodiments.

As shown in FIG. 1C, the base fluid (Fluid 1) exhibited an ES value of 850 V. When CaCl$_2$ was replaced with the PBS brine solution, the ES increased to 1020 V. This enhancement indicates superior emulsion stability, demonstrating the capability of PBS to improve the performance of oil-based drilling fluids.

The rheological properties of drilling fluids significantly influence drilling efficiency, cuttings transport, and wellbore stability. The fluids were tested after being heated to 150° F. at atmospheric pressure to evaluate their flow behavior.

Figure 2:
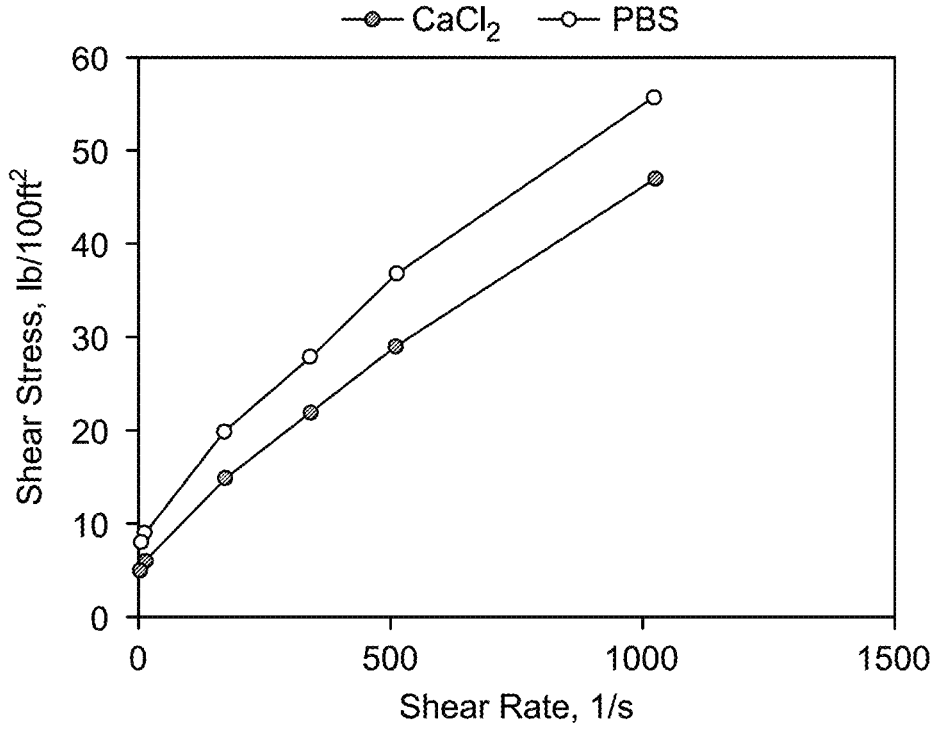
FIG. 2 depicts shear rate behavior of the invert emulsion drilling fluids, according to certain embodiments.

The relationship between shear stress and shear rate for both formulations is illustrated in FIG. 2. The results indicate that both fluids exhibited typical non-Newtonian flow behavior, which is important for effective hole cleaning and cuttings suspension.

Figure 3:
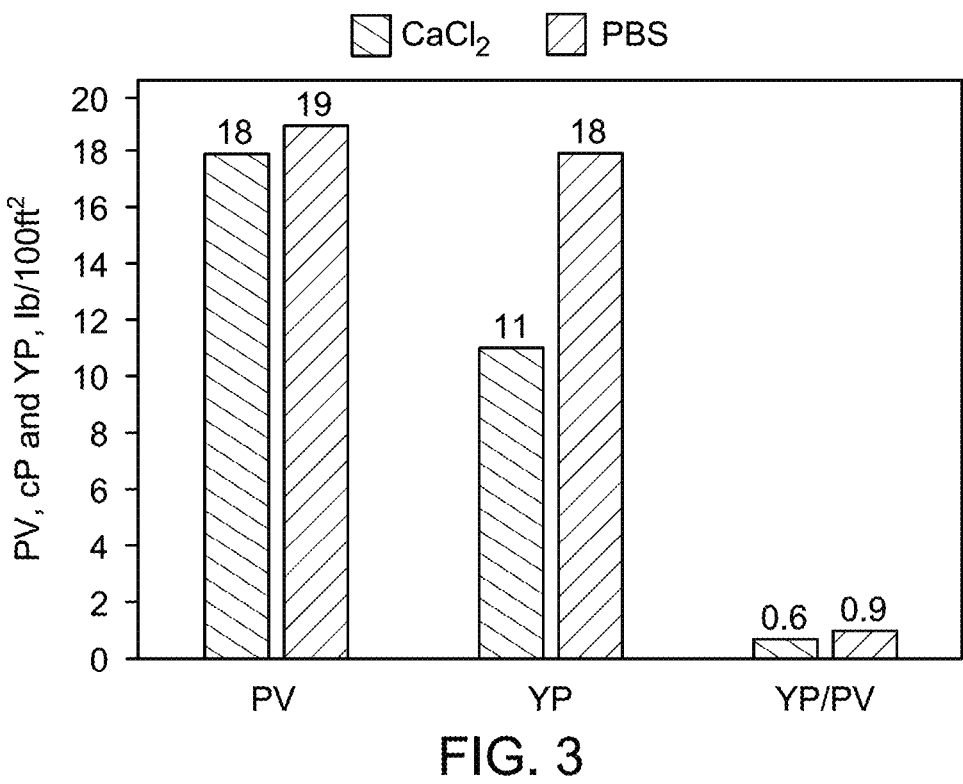
FIG. 3 depicts rheological properties of the invert emulsion drilling fluids, according to certain embodiments.
Figure 4:
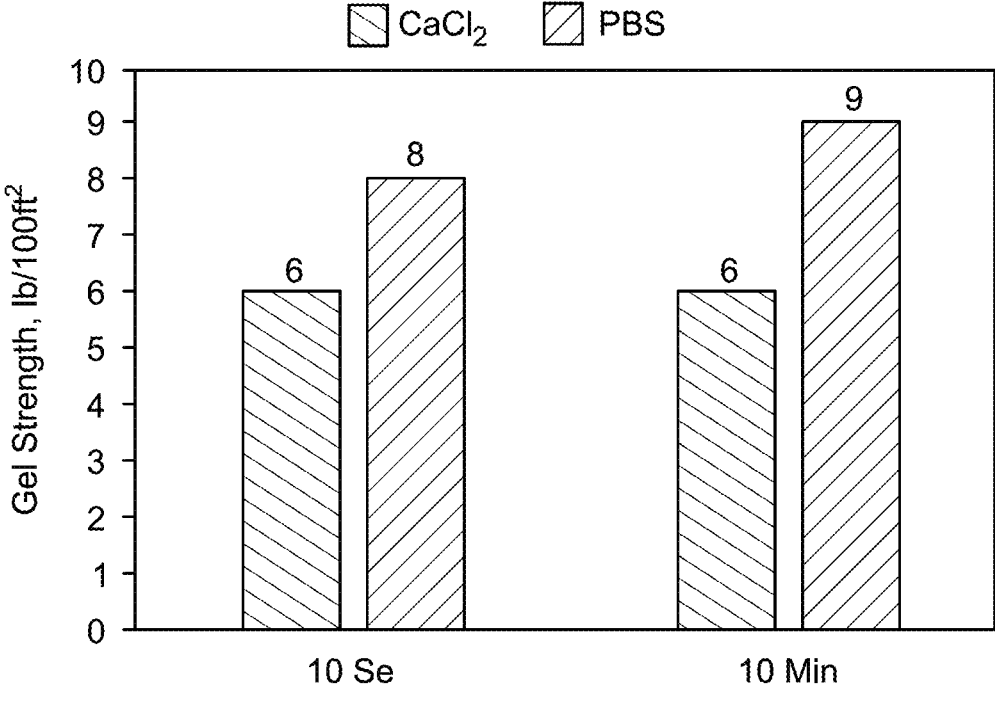
FIG. 4 depicts gel strength results for the invert emulsion drilling fluids, according to certain embodiments.

Plastic viscosity (PV) and yield point (YP) are key rheological parameters influencing the efficiency of drilling fluid. FIG. 3 presents a comparative analysis of these properties. Fluid 1 (CaCl$_2$) has a plastic viscosity of 18 cP, while Fluid 2 (PBS) showed a slightly higher plastic viscosity, at 19 cP, indicating improved resistance to flow under pressure. Meanwhile, Fluid 1 showed a yield point of 11 lb/100 ft$^2$, while Fluid 2 showed 63% increase in yield point, which is at 18 lb/100 ft$^2$. The increase in yield point improves hole cleaning efficiency. Overall, the YP/PV ratio of Fluid 2 increase to 0.9, compared to that of Fluid 1 at 0.6, indicating improved carrying capacity for drilled cuttings.

Gel strength determines fluid's ability to suspend cuttings when circulation stops. The results at 10 seconds and 10 minutes confirm that both fluids exhibit flat rheology, meaning minimal differences in gel strength over time, reducing risks of pressure surges and fluid losses.

Figures 5, 6:
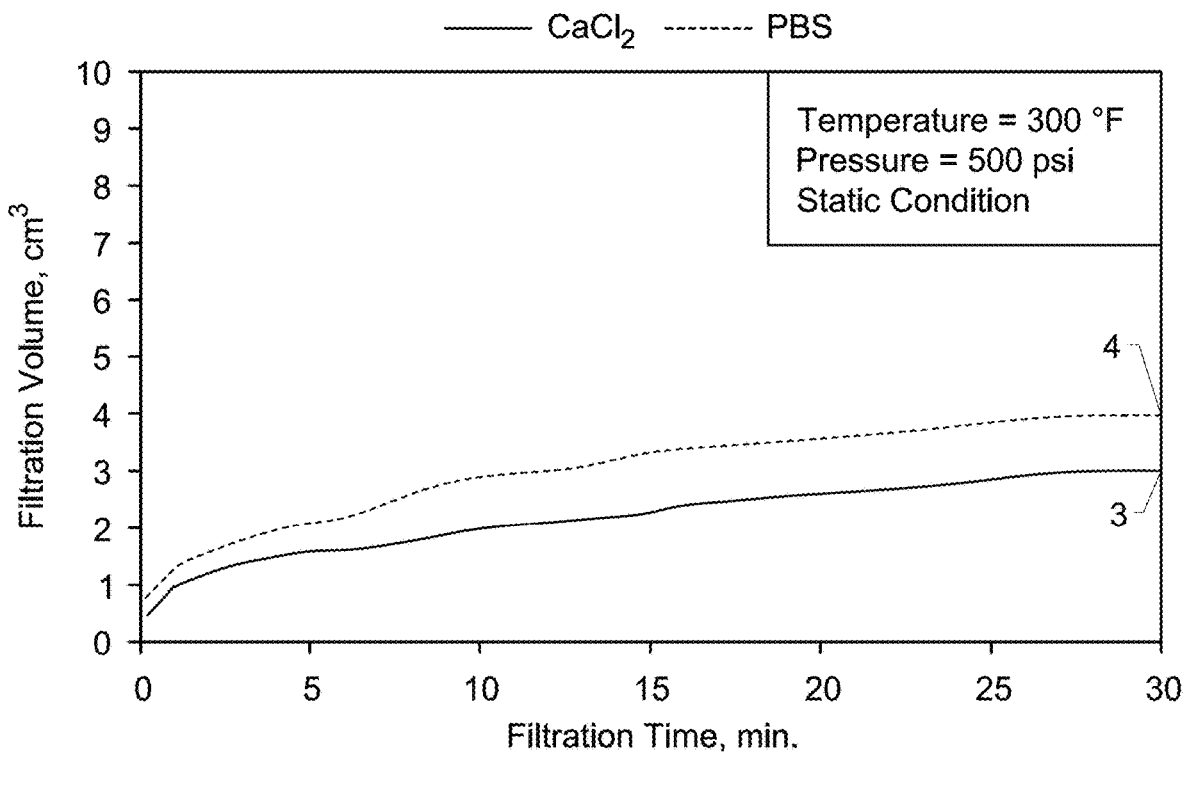
FIG. 5 depicts filtrate volume vs. time for the invert emulsion drilling fluids, according to certain embodiments.
FIG. 6 depicts formulated filter cake for the invert emulsion drilling fluids, according to certain embodiments.

Filtration control is important in preventing excessive fluid loss into the formation. A high-temperature, high-pressure (HTHP) filtration test was conducted at 300° F. and 500 psi differential pressure. FIG. 5 shows filtration performance of both formulations. Filtrate volume was 3 cm$^3$ for CaCl$_2$ and 4 cm$^3$ for the fluid with PBS. The filter cake thickness was 0.89 mm for the OBM with CaCl$_2$ and 1.26 mm for the OBM with PBS. Although the PBS-based fluid showed a slightly higher filtrate volume and filter cake thickness, both values remain within the acceptable range for drilling operations, demonstrating its effectiveness.

Shale swelling can cause severe wellbore instability. A 24-hour swelling test was conducted at room conditions using bentonite cubes immersed in both fluid formulations. In this test Na-bentonite was pressed for 30 minutes at 6000 psi using compactor to obtain bentonite wafer. Then, the Na-bentonite wafer is immersed in drilling fluid at atmospheric pressure and ambient temperature for 24 hours. The oil-based drilling fluid tests are under American Petroleum Institute (API RP 13B-2).

Figure 7:
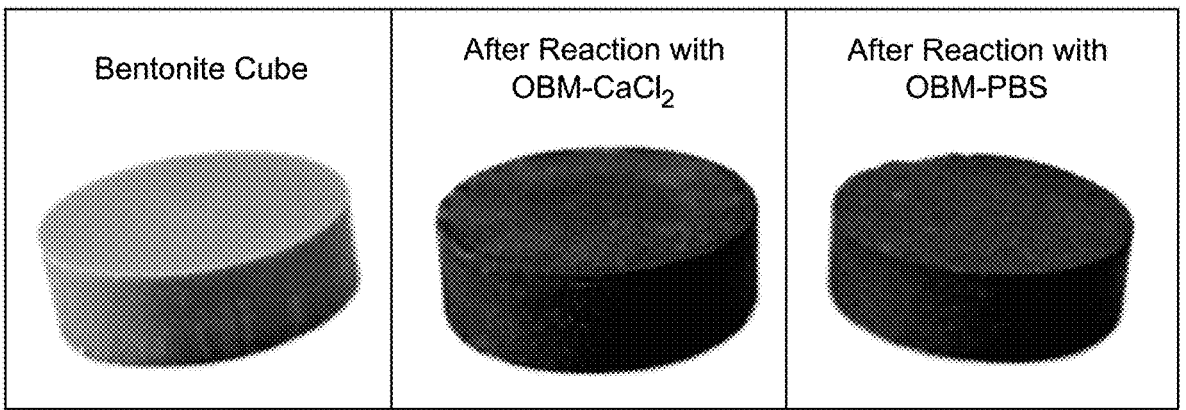
FIG. 7 depicts bentonite cubes before and after reaction with the invert emulsion drilling fluids, according to certain embodiments.

The results (FIG. 7) confirm that no significant swelling or expansion occurred, demonstrating that both fluids effectively inhibit shale hydration. The PBS-based brine solution successfully prevents water invasion, making it a viable alternative to traditional CaCl$_2$-based formulations.

Figure 8:
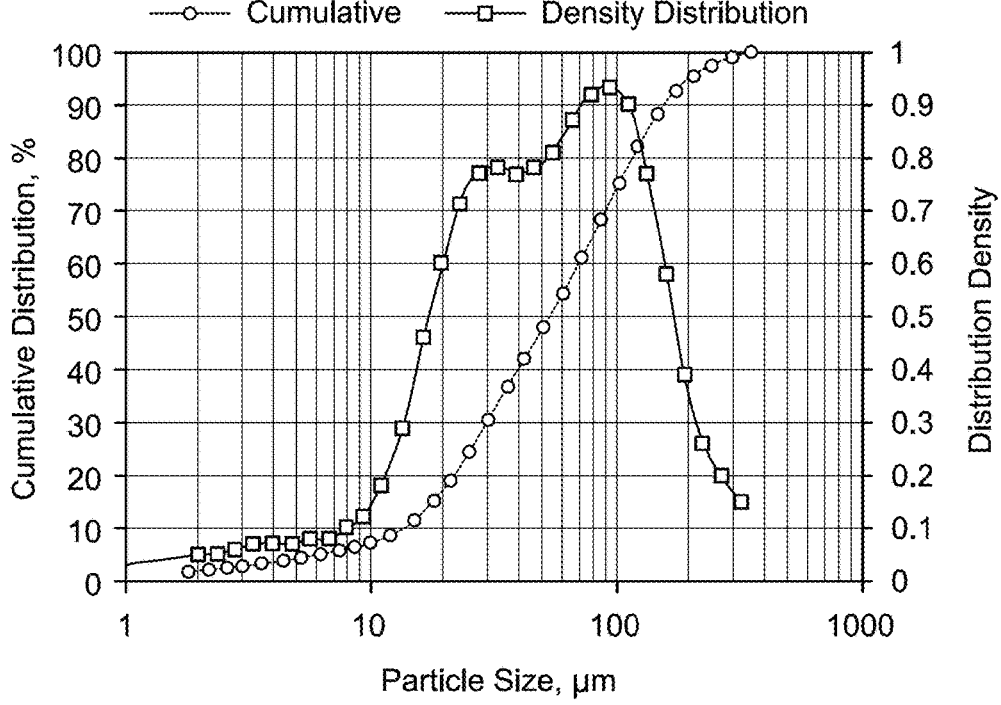
FIG. 8 depicts particle size distribution of polished brine sludge (PBS) powder, according to certain embodiments.
Figure 9A:
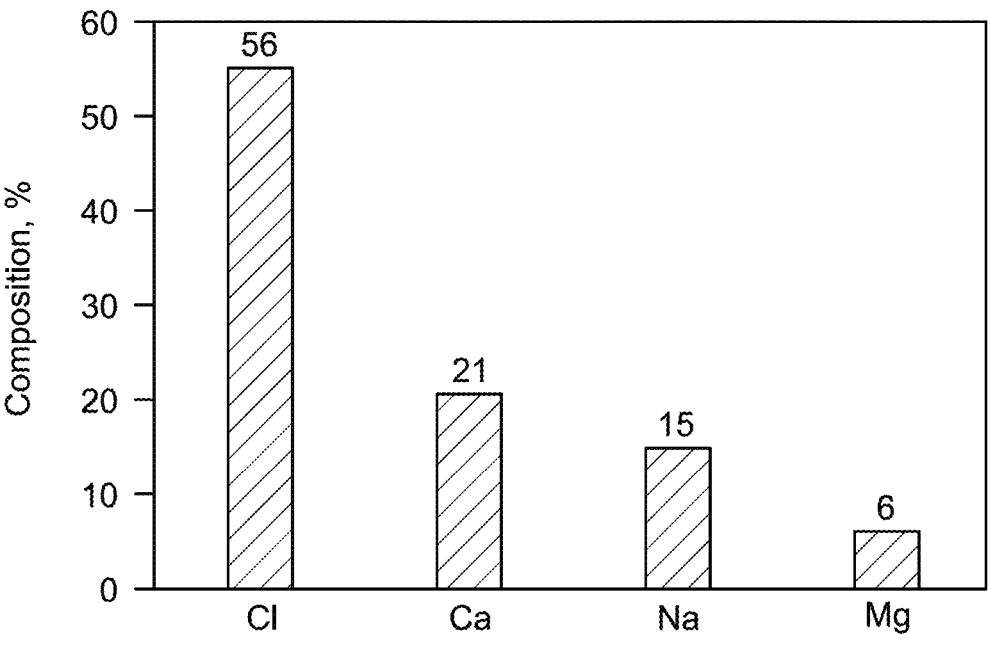
FIG. 9A depicts X-ray fluorescence (XRF) analysis of PBS powder, according to certain embodiments.
Figure 9B:
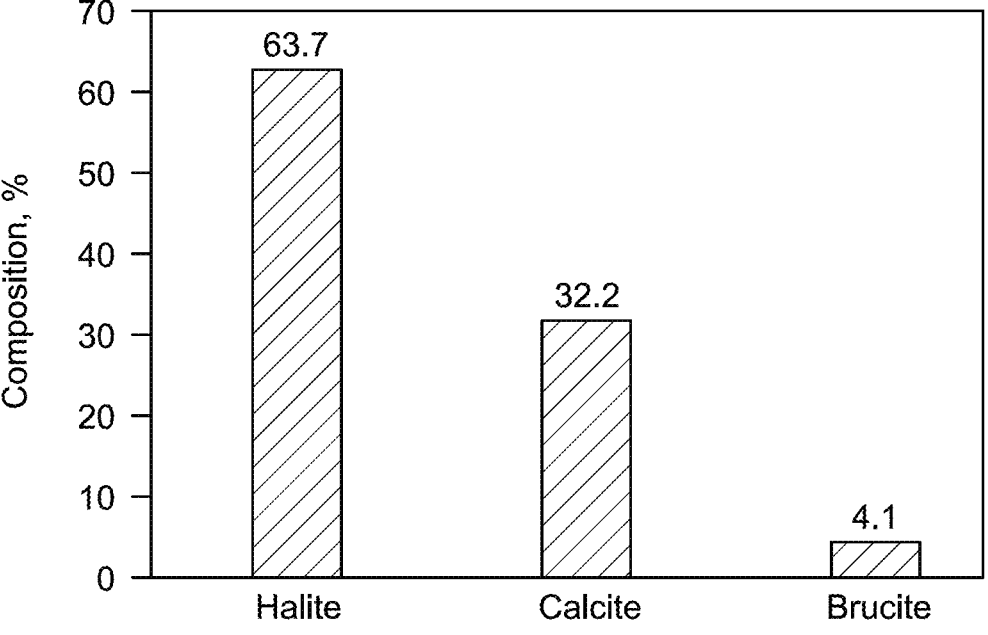
FIG. 9B depicts X-ray diffraction (XRD) compounds compositions of PBS powder, according to certain embodiments.

FIG. 8 presents the particle size distribution of polished brine sludge powder that was sieved through a 100 μm mesh screen. The density distribution curve shows the concentration of particles at various sizes, peaking around 20-50 μm, indicating this is the dominant particle size range. The cumulative distribution curve indicates that nearly 100% of the particles are below 100 μm, with most particles being smaller than 50 μm. FIG. 9A presents X-ray fluorescence (XRF) analysis of polished brine sludge, revealing that chlorine (Cl) is the most prevalent element, accounting for around 40% of the composition. Significant amounts of calcium (Ca) and sodium (Na) are also present at approximately 21% and 15%, respectively. Magnesium (Mg) contribute about 6%. This analysis emphasizes the predominance of sodium chloride salt and calcium carbonate in the sludge. Meanwhile, FIG. 9B shows X-ray diffraction (XRD) analysis, where halite is the major mineral, including over 60% of the sample. Calcite makes up about 30%, and brucite is present in trace amounts, representing less than 5%, indicating the sludge consists mainly of halite and calcite, with minor other contents.

The present disclosure demonstrates the feasibility of using polished brine sludge (PBS) as a sustainable alternative to CaCl$_2$ in invert emulsion drilling fluids. The key findings include enhanced electrical stability: increased from 850 V to 1020 V; improved rheological properties: YP increased by 63%, enhancing hole cleaning efficiency; comparable filtration performance: filtrate volume and filter cake thickness remain within industry standards; effective shale inhibition: zero swelling observed in bentonite cubes.

By repurposing waste-derived PBS as a drilling fluid additive, the approach offers significant economic and environmental advantages, contributing to sustainable drilling operations while maintaining or even enhancing fluid performance.

In the present disclosure, the drilling fluid composition is described. The drilling fluid composition includes an invert emulsion system with an oil-to-water ratio of approximately 80:20. The aqueous phase includes PBS solution as a brine source, replacing conventional calcium chloride, thereby enhancing fluid performance and environmental sustainability. The PBS brine solution consists primarily of sodium chloride with trace elements that improve electrical stability and rheological properties compared to conventional calcium chloride-based systems. The use of PBS brine solution increases electrical stability (ES) by at least 20%, improving the integrity and emulsion stability of the drilling fluid. A method for preparing an invert emulsion drilling fluid includes mixing diesel oil as the continuous phase; adding a primary emulsifier and a secondary emulsifier; introducing polished brine sludge (PBS) solution as the brine phase; incorporating viscosifiers, weighting agents, and alkalis to achieve the desired rheological properties; adjusting the formulation to achieve a density of 11.7 ppg; subjecting the fluid to high-temperature, HTHP conditions to assess performance. Replacing calcium chloride brine with PBS brine enhances YP by at least 60%, improving hole cleaning efficiency. The formulated drilling fluid exhibits a YP/PV ratio increase from 0.6 to 0.9, leading to better suspension of drilled cuttings and reduced risk of solids settling. The gel strength properties remain within the desired range at 10 seconds and 10 minutes, ensuring stable suspension properties and minimal risk of barite sagging. The HTHP filtration volume remains within 3-5 cm$^3$ at 300° F. and 500 psi, maintaining wellbore integrity and preventing excessive fluid loss.

A method for mitigating shale swelling and wellbore instability is described. The method includes applying an invert emulsion drilling fluid containing PBS brine solution. A 24-hour exposure test confirms negligible bentonite cube expansion, demonstrating effective shale inhibition. PBS is utilized as an alternative to conventional calcium chloride, offering cost reduction, environmental benefits, and enhanced drilling performance, making it viable for eco-friendly oil and gas drilling operations. The drilling fluid can be used to drill vertical, decline and horizontal wells. The drilling fluid ion can be used to drill oil, gas, water wells. The drilling fluid ion can be used to drill hydrogen storage wells, $CO_2$ sequestration wells.

Numerous modifications and variations of the present disclosure are possible in light of the above teachings. It is therefore to be understood that within the scope of the appended claims, the present disclosure may be practiced otherwise than as specifically described herein.

The invention claimed is:

1. A method of drilling a wellbore into a subterranean geological formation, comprising:
    drilling the subterranean geological formation to form the wellbore; and
    circulating an invert emulsion drilling fluid into the wellbore during the drilling to suspend cuttings formed during the drilling,
    wherein the invert emulsion drilling fluid comprises:
    diesel;
    a primary emulsifier;
    a secondary emulsifier;
    a brine comprising water and a polished brine sludge (PBS) powder comprising halite in an amount of 55 to 75 wt. %, calcite in an amount of 25 to 40 wt. %, and brucite in an amount of 2 to 6 wt. %, based on the total dry weight of the PBS powder;
    at least one viscosifier;
    at least one weighting agent; and
    at least one alkali,
    wherein the invert emulsion drilling fluid has an oil-to-water volume ratio of 90:10 to 70:30; and
    wherein the invert emulsion drilling fluid does not comprise calcium chloride,
    wherein the subterranean geological formation is a shale formation and the invert emulsion drilling fluid does not expand shale adjacent to the wellbore.

2. The method of claim 1, wherein the PBS powder comprises chlorine in an amount of 40 to 70 wt. %, calcium in an amount of 15 to 30 wt. %, sodium in an amount of 10 to 20 wt. %, magnesium in an amount of 3 to 9 wt. %, based on the total dry weight of the PBS powder.

3. The method of claim 1, wherein the invert emulsion drilling fluid comprises diesel in an amount of 60 to 75 vol %, brine in an amount of 10 to 25 vol %, and a total amount of the primary and secondary emulsifiers of 10 to 15 vol %, based on the total volume of the invert emulsion drilling fluid.

4. The method of claim 1, wherein the primary emulsifier and the secondary emulsifier are present in the invert emulsion drilling fluid at a volume ratio of 1 to 3:1.

5. The method of claim 1, wherein the invert emulsion drilling fluid has an electrical stability of 900 to 1200 V.

6. The method of claim 1, wherein the invert emulsion drilling fluid has a plastic viscosity of 18 to 20 cP.

7. The method of claim 1, wherein the invert emulsion drilling fluid has a yield point of 15 to 21 lb/100 ft$^2$.

8. The method of claim 1, wherein the invert emulsion drilling fluid has a filtration volume of 2 to 6 cm$^3$ at a temperature of 125 to 175° C. and a pressure of 400 to 600 psi.

9. The method of claim 1, wherein the invert emulsion drilling fluid has a gel strength of 7 to 12 lb/100 ft$^2$.

10. The method of claim 1, further comprising:
    forming the invert emulsion drilling fluid by:
    combining the diesel with the primary emulsifier and the secondary emulsifier to obtain an oil mixture;
    mixing the brine with the oil mixture to obtain an emulsion;
    adding the viscosifiers, the weighting agents, and the alkali to the emulsion to obtain the drilling fluid composition.

11. The method of claim 1, wherein the PBS powder has a particle size less than or equal to 100 μm.

12. The method of claim 1, wherein the primary emulsifier and the secondary emulsifier are at least two selected from the group consisting of amidoamines, imidazolines, alkanolamides, and modified fatty acids.

13. The method of claim 1, wherein the viscosifier is at least one selected from the group consisting of organophilic clays, polymeric viscosifiers, liquid viscosifiers, and fumed silica.

14. The method of claim 1, wherein the weighting agent is at least one selected from the group consisting of barite, hematite, calcium carbonate, siderite, ilmenite, and combinations thereof.

15. The method of claim 1, wherein the alkali is at least one selected from the group consisting of sodium hydroxide, potassium hydroxide, sodium carbonate, potassium carbonate, and combinations thereof.

16. The method of claim 1, wherein the invert emulsion drilling fluid is used to drill a vertical well, a decline well, and a horizontal well.

17. The method of claim 1, wherein the invert emulsion drilling fluid is used to drill an oil well, a gas well, and a water well.

18. The method of claim 1, wherein the invert emulsion drilling fluid is used to drill a hydrogen storage well and a $CO_2$ sequestration well.

19. The method of claim 1, wherein the invert emulsion drilling fluid has a density of 11 to 13 ppg.

* * * * *